(12) United States Patent
Saitou

(10) Patent No.: US 8,014,269 B2
(45) Date of Patent: Sep. 6, 2011

(54) RADIO RECEIVER, SIGNAL PROCESSING METHOD AND PROGRAM PRODUCT

(75) Inventor: Tatsuhito Saitou, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 436 days.

(21) Appl. No.: 11/808,459

(22) Filed: Jun. 11, 2007

(65) Prior Publication Data

US 2007/0291637 A1    Dec. 20, 2007

(30) Foreign Application Priority Data

Jun. 16, 2006 (JP) ................................. 2006-166824

(51) Int. Cl.
*H04J 11/00* (2006.01)
*H04K 1/10* (2006.01)
*H04L 27/28* (2006.01)

(52) U.S. Cl. ........ 370/208; 370/252; 370/343; 375/260; 375/267

(58) Field of Classification Search .............. 370/208, 370/252, 343; 375/260, 267

See application file for complete search history.

(56) References Cited

U.S. PATENT DOCUMENTS

| | | | | |
|---|---|---|---|---|
| 6,922,388 | B1 * | 7/2005 | Laroia et al. .................. | 370/208 |
| 7,242,720 | B2 * | 7/2007 | Sugiyama et al. ............ | 375/260 |
| 7,414,963 | B2 * | 8/2008 | Kumar et al. ................. | 370/206 |
| 7,526,042 | B2 * | 4/2009 | Yoshida ........................ | 375/285 |
| 7,606,138 | B2 * | 10/2009 | Wang et al. ................... | 370/210 |
| 2005/0219998 | A1 * | 10/2005 | Kumar et al. ................ | 370/203 |
| 2005/0232217 | A1 * | 10/2005 | Do et al. ....................... | 370/343 |
| 2005/0276337 | A1 * | 12/2005 | Khan ............................ | 375/260 |
| 2006/0120468 | A1 * | 6/2006 | Lin et al. ...................... | 375/260 |
| 2006/0172713 | A1 | 8/2006 | Suzuki et al. | |
| 2007/0086329 | A1 * | 4/2007 | Glazko et al. ................ | 370/208 |
| 2008/0292036 | A1 * | 11/2008 | Wilhelmsson et al. ....... | 375/348 |
| 2009/0080555 | A1 * | 3/2009 | Li .................................. | 375/260 |
| 2009/0201797 | A1 | 8/2009 | Suzuki et al. | |
| 2009/0225910 | A1 | 9/2009 | Suzuki et al. | |

FOREIGN PATENT DOCUMENTS

| | | |
|---|---|---|
| JP | 2002-084332 A | 3/2002 |
| JP | 2005-210170 (A) | 8/2005 |
| JP | 2006-115094 (A) | 4/2006 |
| WO | WO 2005/002101 (A1) | 6/2005 |

OTHER PUBLICATIONS

Bakir, "Optimization of Guard Interval for OFDM Performance over Fading and AWGN Channels using Genetic Algorithm", IEEE 6th CAS Symp. on Emerging Technologies: Mobile and Wireless Comm., Shanghai, China (May 31-Jun. 2, 2004).*

* cited by examiner

*Primary Examiner* — Alpus H Hsu
(74) *Attorney, Agent, or Firm* — Foley & Lardner LLP

(57) ABSTRACT

A radio receiver receives a signal transmitted through a radio transmission path. In the signal, a no-signal interval is inserted between orthogonal frequency division multiplexed (OFDM) symbols. The radio receiver includes a determining unit to determine an overlap-addition number based on delay characteristics of a received signal, and an adder to add data corresponding to the overlap-addition number determined by the determining unit out of data received in the no-signal interval to a top portion of an OFDM symbol of the received signal.

6 Claims, 12 Drawing Sheets

PRIOR ART

RADIO RECEIVER, SIGNAL PROCESSING METHOD AND PROGRAM PRODUCT

BACKGROUND OF THE INVENTION

1. Field of the Invention

The present invention relates to a radio receiver and, particularly, to a radio receiver of the MB-OFDM system that absorbs a delayed wave due to multipath by inserting a no-signal interval, such as zero suffix or zero prefix, into a transmission signal.

2. Description of Related Art

In the radio communications, techniques of inserting a guard interval into a transmission signal and performing adaptive equalization at a receiver end are used in order to reduce the effects of multipath fading.

For example, in UWB (Ultra Wide Band), which is the short distance radio communication technology that is standardized as ECMA-368 by ECMA (European Computer Manufacturer Association) and uses MB-OFDM (Multi-band Orthogonal Frequency Division Multiplexing) for the PHY layer, the zero suffix (ZS) containing 37 samples is inserted after the OFDM symbol containing 128 samples, which is generated by IFFT (Inverse Fast Fourier Transform) as shown in FIG. 8. A UWB transmitter superimposes the transmission data containing the zero suffix upon a carrier wave and transmits it. Because the UWB uses the frequency hopping technology, the UWB transmitter uses three carrier waves with different frequencies and transmits data by a carrier wave which is periodically changed for each OFDM symbol.

Receiving the signal containing the zero suffix, the UWB receiver adds the data of the zero suffix interval, which is inserted after the OFDM symbol, to the top of the OFDM symbol. Such adding process is referred to hereinafter as "overlap-addition". The overlap-addition performed in the UWB receiver compensates the effects of the multipath fading in a transmission path between the UWB transmitter and the UWB receiver. Five samples of time out of the 37 samples of zero data which are inserted as the zero suffix is assigned as a time to switch a carrier frequency in the receiver. Thus, the number of samples used for the overlap-addition is 32.

FIG. 9 shows the configuration of an OFDM receiver 7 according to a related art. The receiving operation of the MB-OFDM receiver 7 is briefly described hereinafter with reference to FIG. 9. A signal which is received by an antenna 11 is band-selected by a band pass filter (BPF) 12 and then amplified by a low noise amplifier (LNA) 13. The BPF 12 is a filter to select a band group to receive from a plurality of band groups of MB-OFDM to thereby remove out-of-band noises and interference waves. The signal which is amplified by the LNA 13 is quadrature-demodulated by a quadrature demodulator 14. Because the frequency hopping is performed in the MB-OFDM system, a local frequency fc which is generated by an oscillator (not shown) and input to the quadrature demodulator is periodically switched according to a frequency hopping pattern.

A baseband signal which is demodulated by the quadrature demodulator 14 is input to a low pass filter (LPF) 15, so that its high frequency component is filtered out. The signal is then amplified to a prescribed signal level by a variable gain amplifier (VGA) 16.

An A/D converter (ADC) 17 performs sampling and quantization of the baseband signal which is amplified by the VGA 16 and outputs a discrete digitized baseband signal. The output signal of the ADC 17 is input to a synchronous processing unit 18.

The synchronous processing unit 18 captures the OFDM signal symbol synchronous timing and the frame synchronous timing. Further, it removes a preamble and rotates the phase of the input baseband signal so as to correct the phase error between the carrier wave frequency of the received signal and the local frequency used for the quadrature demodulation. The synchronous processing unit 18 includes a correlator (not shown) for calculating a correlation value between an input signal and a known preamble signal and determines the OFDM signal symbol synchronous timing based on the peak of the correlation value calculated by the correlator.

An overlap-adder 79 removes the zero suffix interval from the input baseband signal and adds the 32 samples of data in the zero suffix interval to the top of the OFDM symbol interval.

A FFT unit 20 performs fast Fourier transformation on the baseband signal after the overlap-addition and outputs demodulated data for each subcarrier.

A subcarrier decoder 21 performs frequency equalization, deinterleaving, Viterbi decoding, descrambling or the like on the demodulated data for each subcarrier using pilot tone, and outputs the decoded data.

The process of the overlap-addition performed in the overlap-adder 79 and its problem are described hereinafter. FIG. 10A is a conceptual diagram showing a received signal of the OFDM receiver 7. It shows the signals which are reached through three transmission paths 1 to 3. The transmission path 1 corresponds to a transmission channel of a direct wave, and the transmission paths 2 and 3 correspond to transmission channels of a reflected wave (delayed wave). Thus, the signals received through the transmission paths 2 and 3 are delayed with respect to the signal received through the transmission path 1.

In order to correct the distortion of a received signal due to the existence of such a delayed wave, the overlap-adder 79 performs overlap-addition. FIG. 10B is a conceptual diagram of the overlap-addition process. Specifically, the process adds the 32-sample data of the zero suffix interval (ZS interval) to the top of received data 82 in the 128-sample interval (FFT interval) which corresponds to 1 OFDM symbol from the top of the direct wave. A delayed part 821 of maximum 32 samples which is delayed behind the FFT interval and reached in the ZS interval is thereby added to the received data 82 in the FFT interval. The overlap-addition allows the correction of the distortion of a received signal caused by the existence of a delayed wave due to multipath.

The overlap-adder 79 performs addition represented by the following Expression 1. In Expression 1, Sn[k] indicates received data which is input to the overlap-adder 79, and $S_{out}[k]$ indicates data after overlap-addition which is output from the overlap-adder 79. Thus, the overlap-adder 79 adds 32 samples of data Sn[128] to Sn[159] in the zero suffix interval to the top of the OFDM symbol Sn[0] to Sn[31], thereby generating 128 samples of output data Sout[0] to Sout[127] from 165 samples of input data Sn[0] to Sn[164]. Because 5 samples of data Sn[160] to Sn[164] are a guard interval which is saved for frequency hopping, they are not used for the overlap-addition.

$$S_{out}[k] = \begin{cases} Sn[k] + Sn[k+128] & k \in [0, 31] \\ Sn[k] & k \in [32, 127] \end{cases} \quad \text{Expression 1}$$

FIG. 11 shows an example of the configuration of the overlap-adder 79. The overlap-adder 79 may include a shift memory 80 which is composed of 160 storage cells connected in series, and 32 adders 8100 to 8131.

In the process of overlap-addition, DC offsets and noises in the zero suffix interval are added to the OFDM symbol. For example, because 32-sample data is added to the 128-sample OFDM symbol in the OFDM receiver 7, a noise becomes (128+32)/128 times larger through the overlap-addition. Thus, the overlap-addition causes the penalty of $10 \log_{10} (160/128)=0.97$ dB, so that the required CNR (Carrier to Noise Ratio) deteriorates by about 0.97 dB. Because 32 samples of data are always added regardless of the amount of delay spread in a UWB receiver of a related art, the penalty due to the overlap-addition occurs uniformly regardless of the amount delay spread. The delay spread is a parameter indicating the degree of spread of a signal transmitted through a multipath with respect to time direction, that is, delay characteristics. The delay spread is defined as a root-mean-square value (distribution) of the spread of power distribution of a received signal with respect to a delay time. Because the square root of the delay spread is also used as a parameter to indicate the spread of a received signal, it is referred to hereinafter as RDS (Root-mean-square Delay Spread).

For example, consider the case where the size of the delayed part 821 is much smaller compared with the data length (i.e. 32 samples) of the zero suffix interval (ZS interval), which is the target of the overlap-addition, as shown in FIG. 12A. In FIG. 12A, the reference numeral 82 designates noise. Thus, FIG. 12A shows the case where the delay spread is small. In a UWB receiver of a related art, even if the delayed part 821 is small as shown in FIG. 12A, the 32-sample data in the ZS interval is added as shown in FIG. 12B. Therefore, noise 84 in the 32-sample ZS interval is always overlap-added in addition to the delayer part 821, causing the fixed penalty of about 0.97dB to occur, which leads to the degradation of communication properties.

As described above, the present inventor has recognized that the overlap-addition causes a fixed degree of the degradation of communication properties to always occur regardless of the amount of delay spread of a received signal in a UWB receiver of a related art. Such a problem occurs not only in the above-described UWB receiver but occurs generally in a radio receiver that receives a signal where a no-signal interval such as zero suffix or zero prefix is inserted between orthogonal frequency division multiplexed (OFDM) symbols through a radio transmission path and performs overlap-addition on the received signal.

A radio receiver which is disclosed in Japanese Unexamined Patent Application Publication 2002-84332 estimates the delay spread of a received signal, selects either one of fading distortion compensation by pilot symbol insertion or fading distortion compensation by an adaptive equalizer according to the estimated amount of delay spread, and carries out the fading distortion compensation using the selected method. Thus, this technique allows the radio receiver to select the method of frequency equalization in the subcarrier decoder 21 in FIG. 9 according to the amount of delay spread, and it does not address the above problem.

SUMMARY

In one embodiment, there is provided a radio receiver that receives a signal transmitted through a radio transmission path. In the signal, a no-signal interval is inserted between orthogonal frequency division multiplexed (OFDM) symbols. The radio receiver includes a determining unit to determine an overlap-addition number based on delay characteristics of a received signal, and an adder to add data corresponding to the overlap-addition number determined by the determining unit out of data received in the no-signal interval to a top portion of an OFDM symbol of the received signal.

In this configuration, it is possible to change the overlap-addition number adaptively according to the delay characteristics of a received signal. This suppresses the degradation of communication properties that is caused by the overlap-addition of the data in a zero suffix interval or a zero prefix interval which excessively exceeds the spread of a delay time of a received signal.

In another embodiment, there is provided a signal processing method on a received signal that is transmitted after inserting a no-signal interval between orthogonal frequency division multiplexed (OFDM) symbols and received through a radio transmission path. The method includes determining an overlap-addition number based on delay characteristics of the received signal, and adding data corresponding to the determined overlap-addition number out of data received in the no-signal interval to a top portion of an OFDM symbol of the received signal.

In this signal processing method, it is possible to change the overlap-addition number adaptively according to the delay characteristics of a received signal. This suppresses the degradation of communication properties that is caused by the overlap-addition of the data in a zero suffix interval or a zero prefix interval which excessively exceeds the spread of a delay time of a received signal.

The present invention enables the improvement of the communication properties of a radio receiver which compensates the multipath fading by overlap-adding the data in a no-signal interval such as a zero suffix interval to an OFDM symbol.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF THE PREFERRED EMBODIMENTS

Figure 1:
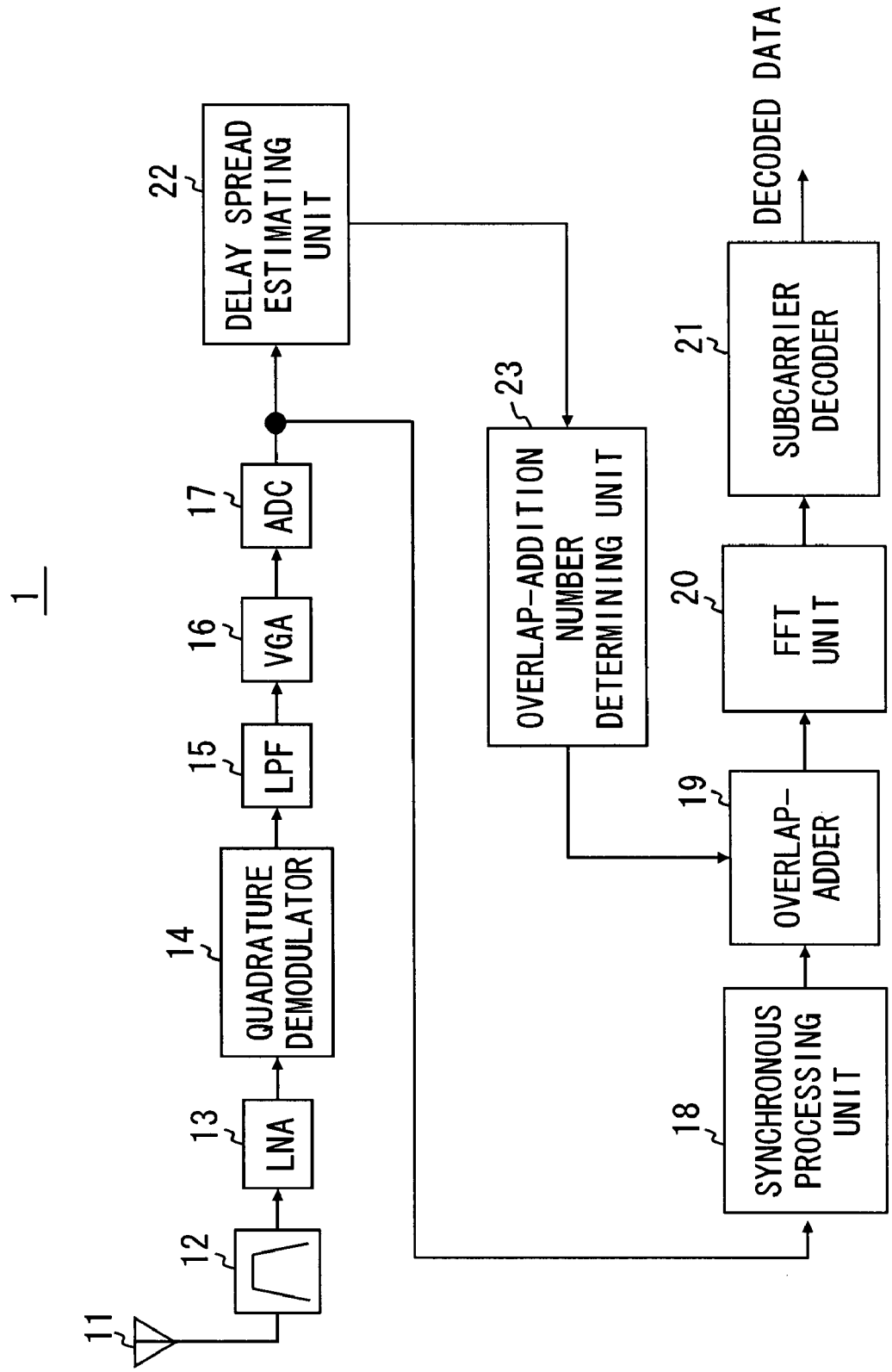
FIG. 1 is a block diagram showing a UWB receiver according to a first embodiment of the present invention.

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Exemplary embodiments of the present invention are described hereinafter in detail with reference to the drawings. In the drawings, the same elements are denoted by the same reference symbols, and redundant description is omitted as appropriate for simplification of description. In the below-described embodiments, the present invention is applied to a UWB receiver.

First Embodiment

FIG. 1 shows the configuration of a UWB receiver 1 according to a first embodiment of the present invention. In FIG. 1, a delay spread estimating unit 22 calculates delay spread of a received signal. As described earlier, the delay spread is an evaluation parameter which reflects the spread of a delay time of a received signal which occurs in the process of transmitting through the multipath. An overlap-addition number determining unit 23 determines an overlap-addition number according to the delay spread which is calculated by the delay spread estimating unit 22. The overlap-addition number is the number of samples in the zero suffix interval which is overlap-added to the OFDM symbol by the overlap-adder 19 as described later. In an OFDM receiver, a maximum number of overlap-addition number is 32, and a minimum number is 0.

The overlap-adder 19 removes a zero suffix interval from an input baseband signal and adds the data of the zero suffix interval to the top of an OFDM symbol interval. The data length, or the number of samples, of the zero suffix interval to be overlap-added by the overlap-adder 19 is variable according to the overlap-addition number which is determined by the overlap-addition number determining unit 23.

The overlap-addition process that is performed in the overlap-adder 19 is expressed by the following Expression 2. In Expression 2, $N_{OAA}$ indicates the overlap-addition number which is determined by the overlap-addition number determining unit 23, and it is $0 \leq N_{OAA} \leq 32$ in the OFDM receiver.

$$S_{out}[k] = \begin{cases} Sn[k] + Sn[k+128] & k \in [0, N_{OAA}-1] \\ Sn[k] & k \in [N_{OAA}, 127] \end{cases} \quad \text{Expression 2}$$

Figure 9:
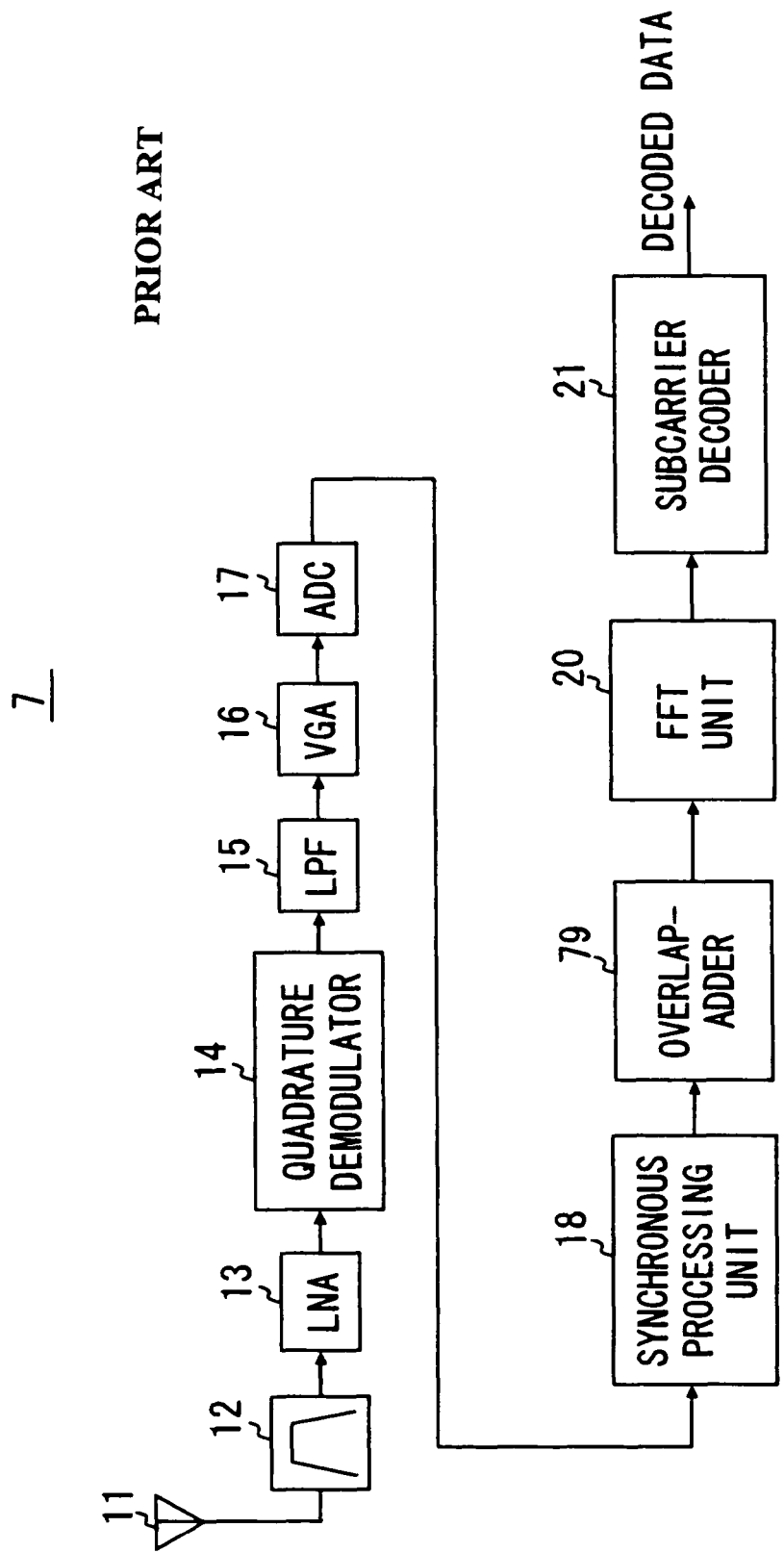
FIG. 9 is a block diagram showing a UWB receiver according to a related art.
Figure 10A:
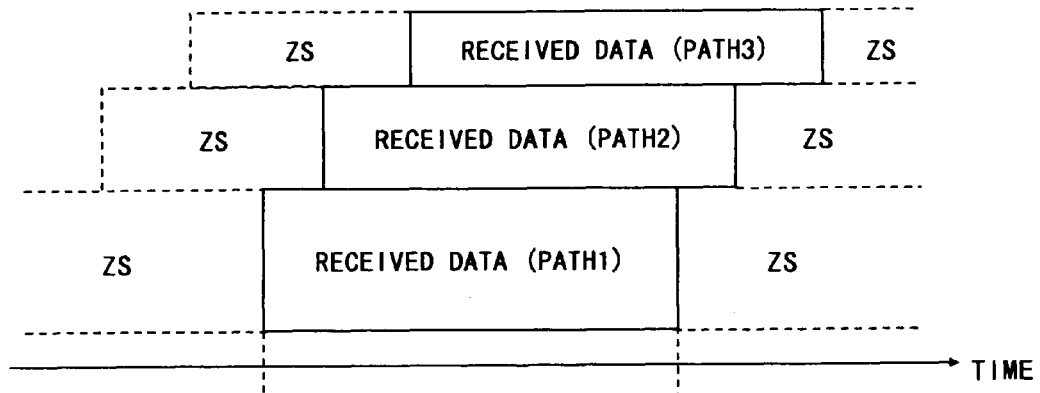
FIGS. 10A and 10B are views to describe the concept of overlap-addition.
Figure 10B:
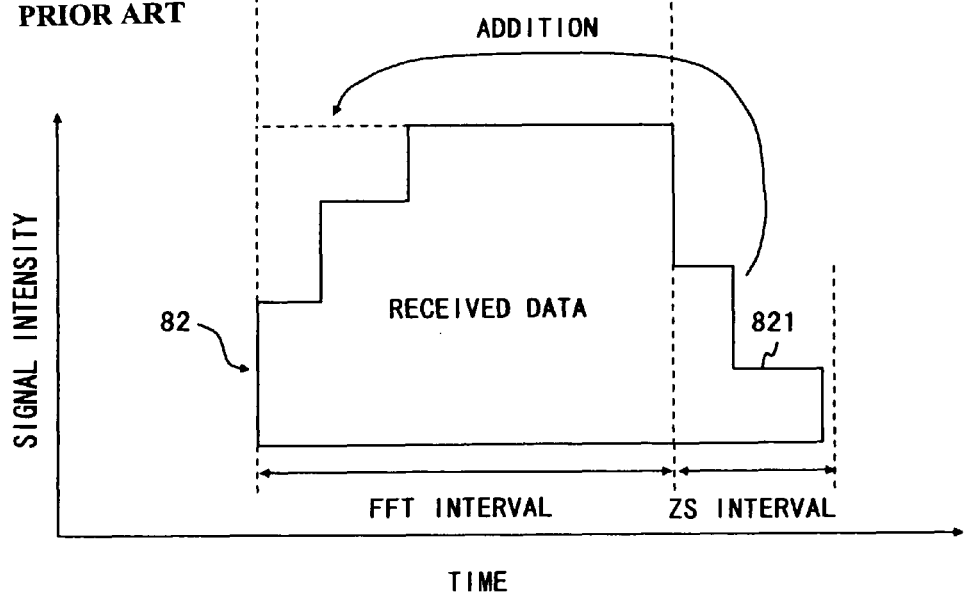

The UWB receiver 1 of this embodiment is able to adaptively change the data length of the zero suffix interval to be overlap-added according to the amount of delay spread. The other elements than the overlap-adder 19, the delay spread estimating unit 22 and the overlap-addition number determining unit 23 are the same as the elements of the UWB receiver 7 of the related art shown in FIG. 9 and they are denoted by the same reference numerals and not described in detail herein.

Figure 2:
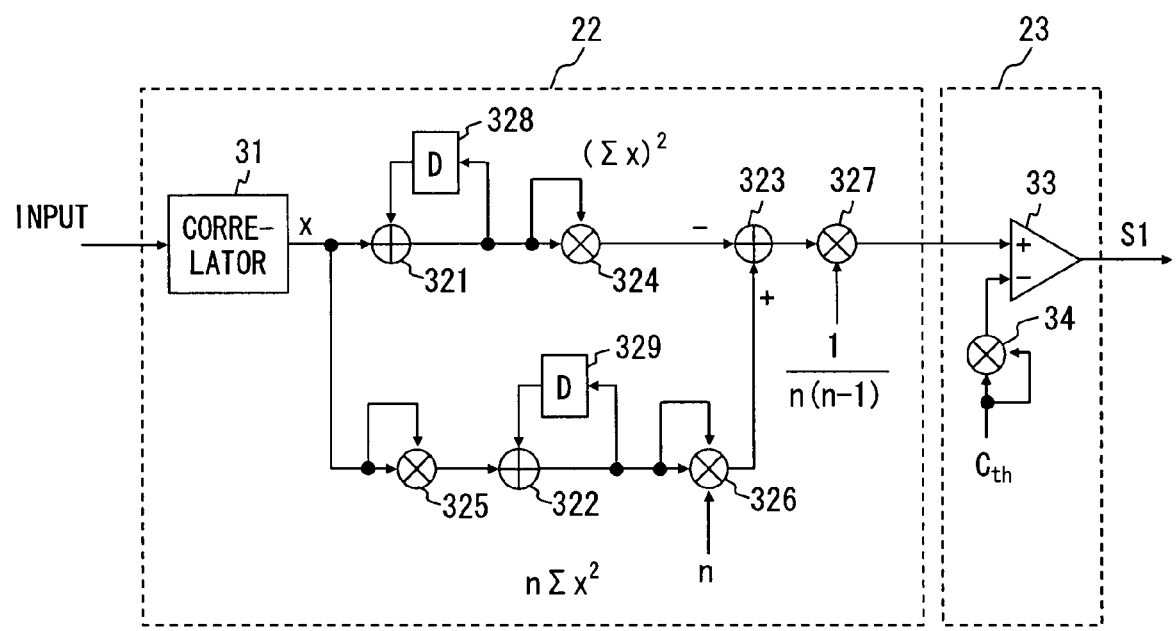
FIG. 2 is a view to describe a specific exemplary configuration of a UWB receiver according to the first embodiment of the present invention.
Figure 3:
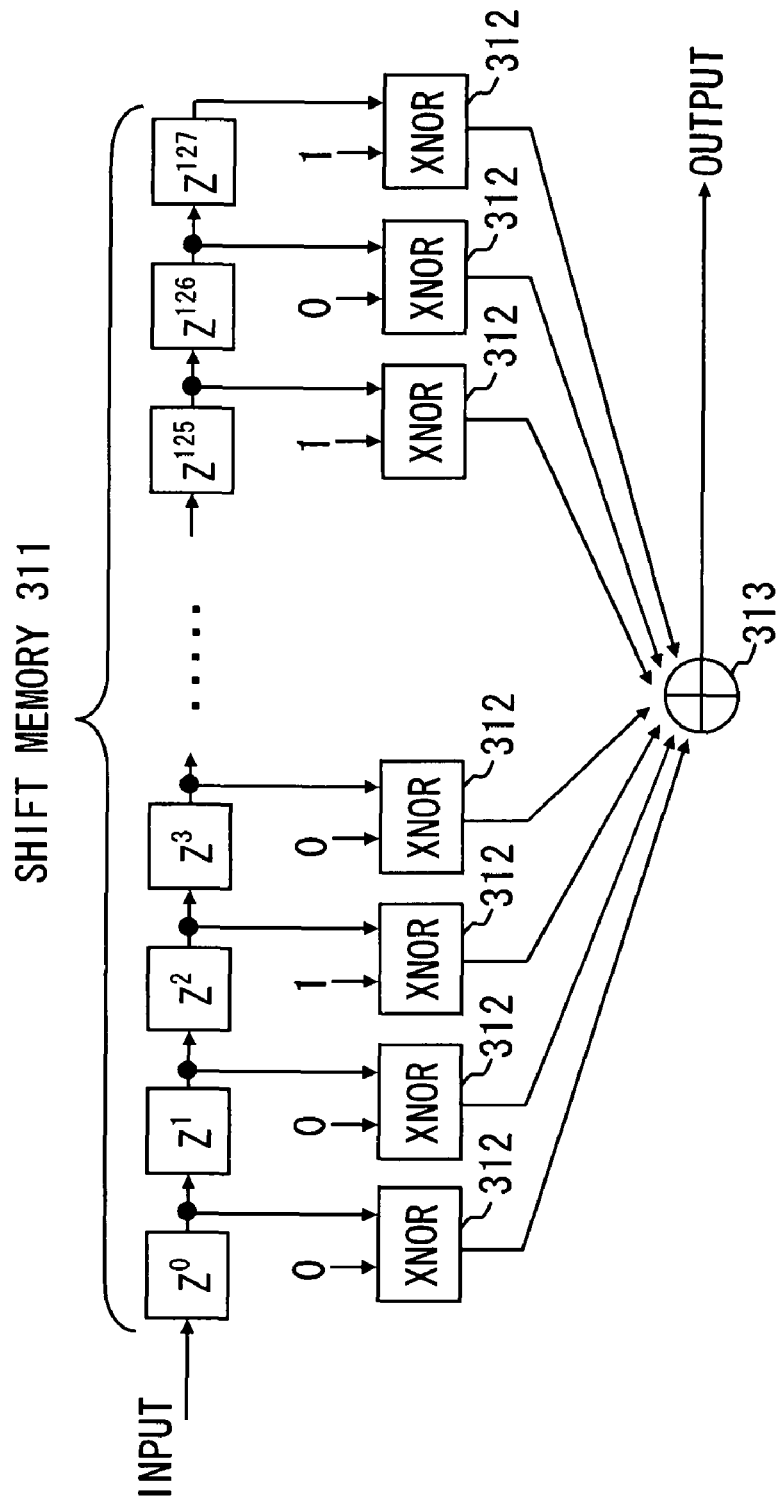
FIG. 3 is a view to describe a specific exemplary configuration of a UWB receiver according to the first embodiment of the present invention.
Figure 4:
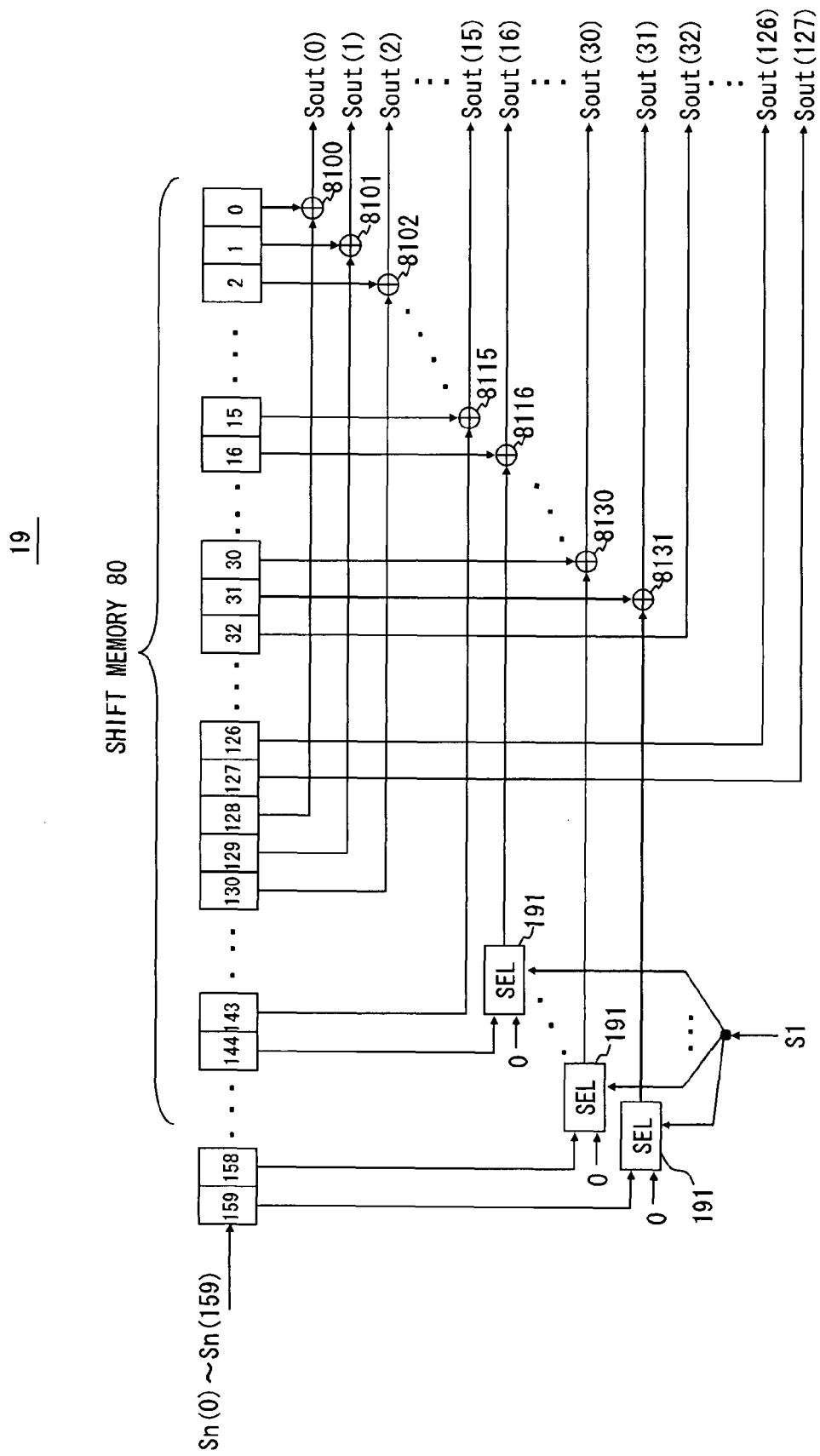
FIG. 4 is a view showing an exemplary configuration of an overlap-adder included in a UWB receiver according to the first embodiment of the present invention.

Referring next to FIGS. 2 to 4, the exemplary configurations of the delay spread estimating unit 22, the overlap-addition number determining unit 23 and the overlap-adder 19 in which the overlap-addition number is switchable between 16 or 32 according to the amount of delay spread are described hereinafter.

FIG. 2 shows the exemplary configurations of the delay spread estimating unit 22 and the overlap-addition number determining unit 23. The delay spread estimating unit 22 of FIG. 2 includes a correlator 31, adders 321 to 323, multipliers 324 to 327, and delay circuits 328 to 329. Each of the delay circuits 328 and 329 generates a delay of 1 sample. The correlator 31 calculates a correlation value between an input signal and a known preamble (specifically, a packet synchronous sequence in a preamble).

A specific example of the correlator 31 is a digital matched filter shown in FIG. 3. In FIG. 3, a shift memory 311 includes storage cells connected in series and is able to store received data of 128 samples, which corresponds to 1 OFDM symbol. The storage value of the shift memory 311 is shifted every 1 sample time. 128 XNOR functional units 312 calculate XNOR of data stored in a storage value of the shift memory 311 and a known packet synchronous sequence pattern. The XNOR results are added by the adder 313 and then output. The processing of the correlator 31 is the same as the processing of a correlator (not shown) included in the synchronous processing unit 18 to capture the packet synchronous timing. It is therefore preferred to share one correlator in common rather than using two separate correlators.

The adders 321 to 323, the multipliers 324 to 327, and the delay circuits 328 to 329 in FIG. 2 are circuits to calculate a distribution $\sigma^2$ of an output of the correlator 31, which is expressed by the following Expression 3. The delay spread estimating unit 22 in FIG. 2 estimates delay spread based on the distribution $\sigma^2$ of the output of the correlator 31. In Expression 3, $x_i$ is an output value of the correlator 31, n is the number of samples used for the calculation of a distribution $\sigma^2$. The sample number n is expressed by the following Expression 4 using a sampling frequency fs[Hz] of the correlator 31 and a maximum allowable value Tsp[sec] of the square root of delay spread RDS. Although the maximum allowable value of RDS varies with transmission distance, it is defined as Tsp=26 ns as a guideline in UWB. In this case, the sample number n is 14 if the sampling frequency of the correlator 31 is 528 MHz.

$$\sigma^2 = \frac{n \sum_{i=1}^{n} x_i^2 - \left(\sum_{i=1}^{n} x_i\right)^2}{n(n-1)} \quad \text{Expression 3}$$

$$n = fs \times Tsp \quad \text{Expression 4}$$

Referring still to FIG. 2, the overlap-addition number determining unit 23 includes a comparator 33. The comparator 33 compares the delay spread calculated by the delay spread estimating unit 22 with the square of a threshold $C_{th}$ and outputs the result as a control signal S1. An adder 34 is used to calculate the square of the threshold $C_{th}$.

The threshold $C_{th}$ can be determined by the following Expression 5. In Expression 5, $T_{th}$ is a threshold for switching the overlap-addition number, which is expressed in units of seconds. If the square root of delay spread RDS which is calculated for a received signal is $T_{th}$ or higher, the signal S1 is High level, and if it is $T_{th}$ or lower, the signal S1 is Low level.

$$C_{th} = T_{th} \times fs \quad \text{Expression 5}$$

Figure 11:
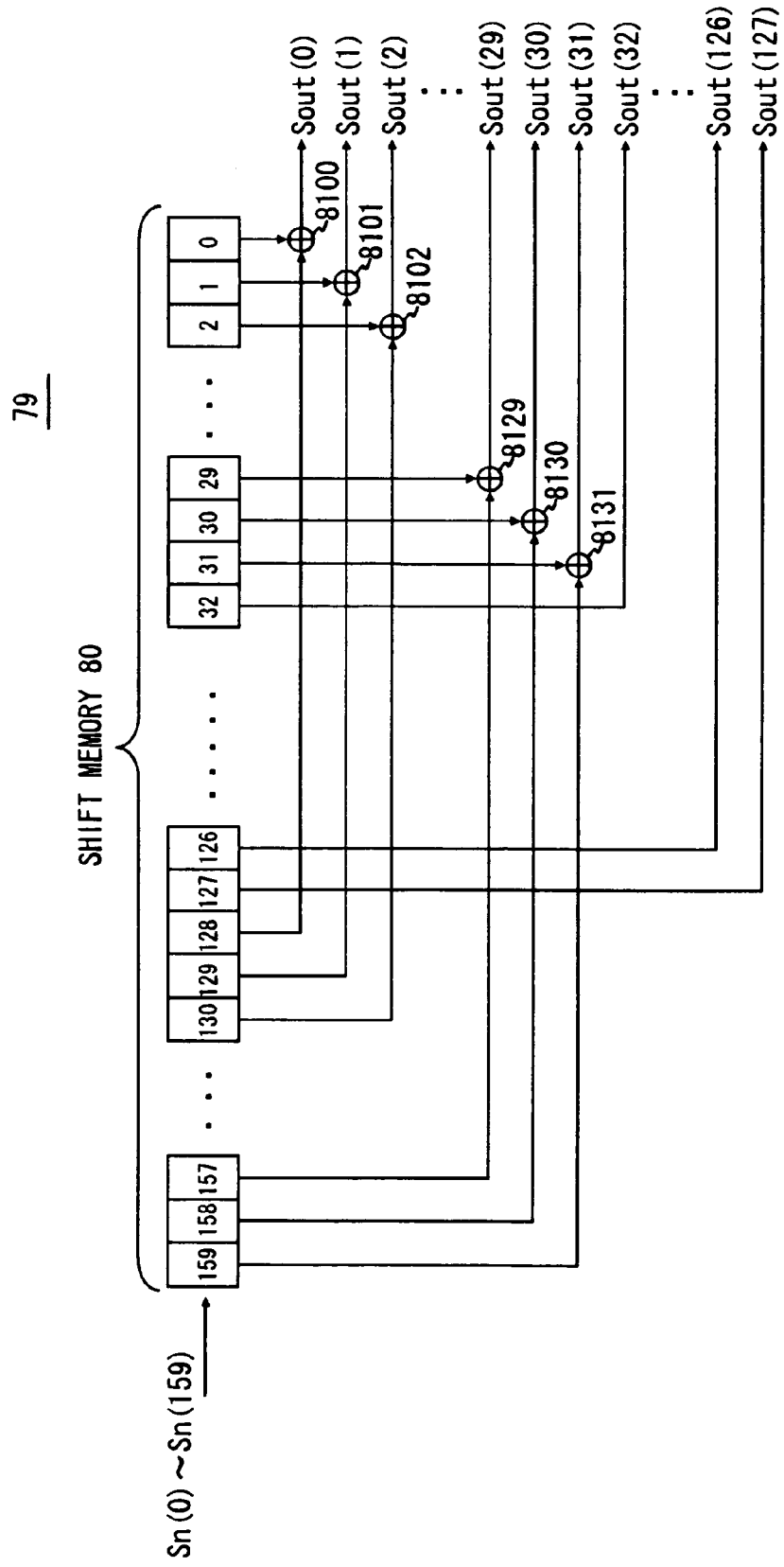
FIG. 11 is a view showing an exemplary configuration of an overlap-adder included in a UWB receiver according to a related art.

FIG. 4 shows an exemplary configuration of the overlap-adder 19. The overlap-adder 19 of FIG. 4 is different from the overlap-adder 79 in the OFDM receiver 7 of a related art shown in FIG. 11 in that the overlap-adder 19 includes 16 selectors 191 for selecting whether or not to overlap-add the latter 16 samples of the zero suffix in accordance with the control signal S1 which is output from the overlap-addition number determining unit 23. Specifically, when the control signal S1 is High level, each selector 191 selects the input from the shift memory 80 and overlap-adds the latter 16 samples Sn[144] to Sn[159] of the zero suffix to the top of the OFDM symbol. If, on the other hand, when the control signal S1 is Low level, each selector 191 selects the input 0. In this case, the latter 16 samples Sn[144] to Sn[159] of the zero suffix is excluded from the target of the overlap-addition.

In the configurations described with reference to FIGS. 2 to 4, it is possible to overlap-add the whole 32 samples in the zero suffix interval when the delay spread is larger than a predetermined threshold and to overlap-add only 16 samples in the zero suffix interval when the delay spread is smaller than a predetermined threshold.

The combination of a threshold or an overlap-addition number with respect to a delay spread can be determined appropriately by simulation or LSI evaluation. The configurations described with reference to FIGS. 2 to 4 are shown by way of illustration only, and the overlap-addition number may be different from 16 and 32, or the overlap-addition number may be selected from three or more kinds of values according to the amount of delay spread. For example, the overlap-addition number determining unit 23 may select one from three overlap-addition numbers 8, 16 and 32 depending on whether the square root of delay spread RDS is smaller than 5 ns, 5 ns or larger and smaller than 10 ns, or 10 ns or larger, and the overlap-adder 19 may perform overlap-addition using the selected overlap-addition number. Although there are various circuit configurations to implement such operation, including the expansion of the configurations shown in FIGS. 2 to 4, detailed description of such specific configurations are not provided herein because they can be easily conceived by those having ordinary skill in the art based on the description of the present specification.

Figure 5A:
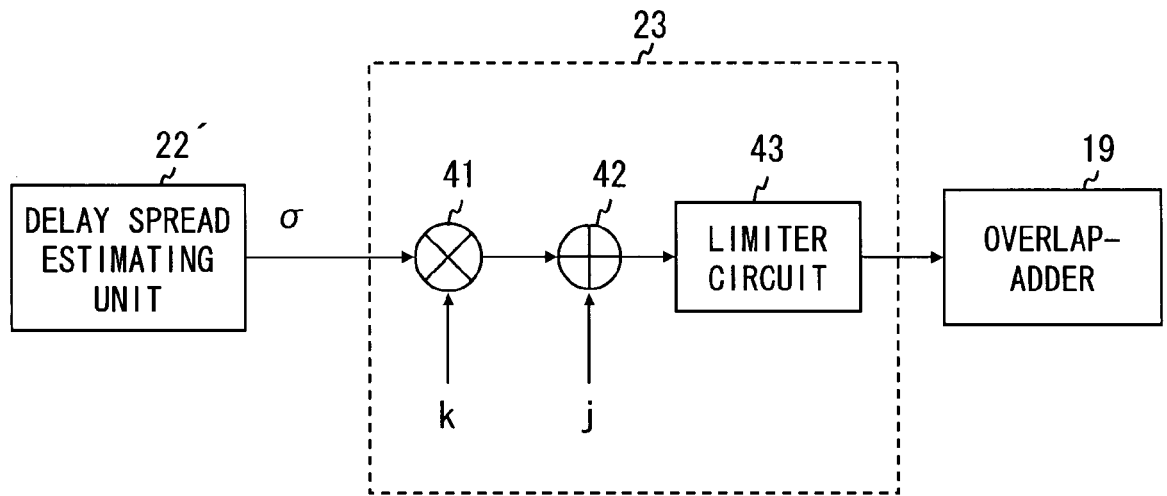
FIGS. 5A and 5B are views to describe a specific exemplary configuration of a UWB receiver according to the first embodiment of the present invention.
Figure 5B:
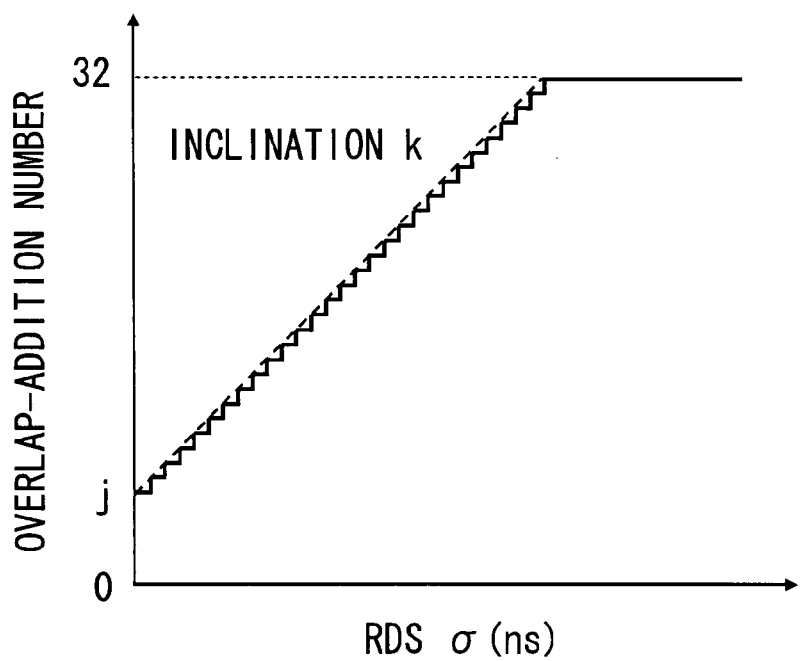

As an alternative example, the configuration shown in FIG. 5A is possible. A delay spread estimating unit 22' in FIG. 5A calculates a root-mean-square delay spread RDS. Specifically, the configuration may calculate the square root of the output of the delay spread estimating unit 22 shown in FIG. 2. The overlap-addition number determining unit 23 in FIG. 5A multiplies the RDS value by a constant k in an multiplier 41 and adds a constant j in an adder 42. A limiter circuit 43 limits the output of the adder 42 not to become a value exceeding a maximum number allowed as an overlap-addition number, which is 32 in a UWB receiver, or a negative value. The overlap-adder 19 in FIG. 5A decodes the overlap-addition number which is output from the overlap-addition number determining unit 23 and adds the data of the zero suffix interval corresponding to the overlap-addition number to the top of the 128-sample OFDM symbol interval (FFT interval). In such a configuration, it is possible to set the overlap-addition number minutely within the range of 33 levels, from 0 to 32, at maximum.

There are various ways to determine the overlap-addition number according to the amount of delay spread. It is, however, typically preferred to determine the overlap-addition number such that the overlap-addition number increases monotonely as the amount of delay spread becomes larger because the overlap-addition number should increase gradually according to the amount of delay spread.

Although the delay spread estimating unit 22, the overlap-addition number determining unit 23 and the overlap-adder 19 are implemented by dedicated circuits in the examples of FIGS. 2 to 4, it is possible to implement these processing by a DSP (Digital Signal Processor). It is also possible to implement the above-described processing by executing on a computer system the software where the processing performed in the delay spread estimating unit 22, the overlap-addition number determining unit 23 and the overlap-adder 19 are described.

The effects of improving the communication properties in a UWB receiver according to this embodiment are described hereinafter. As described earlier, a UWB receiver of a related art always include the 32-sample data in the zero suffix interval as the target of overlap-addition, so that the noise of 32 samples are always added to the OFDM symbol even when the delay spread of a received signal is small. The penalty of adding the 32-sample noises to the 128-sample OFDM symbol is $10 \log_{10}(160/128)=0.97$ dB, and the required CNR (Carrier to Noise Ratio) deteriorates by about 0.97 dB due to the overlap-addition. In addition, if a DC offset occurs in a baseband signal output from the ADC 17, the required CNR further deteriorates due to the overlap-addition of the DC offset component. However, because the amount of deterioration of the required CNR due to the offset depends on a specific circuit configuration of a UWB receiver, the description does not take the DC offset into account.

Figure 6A:
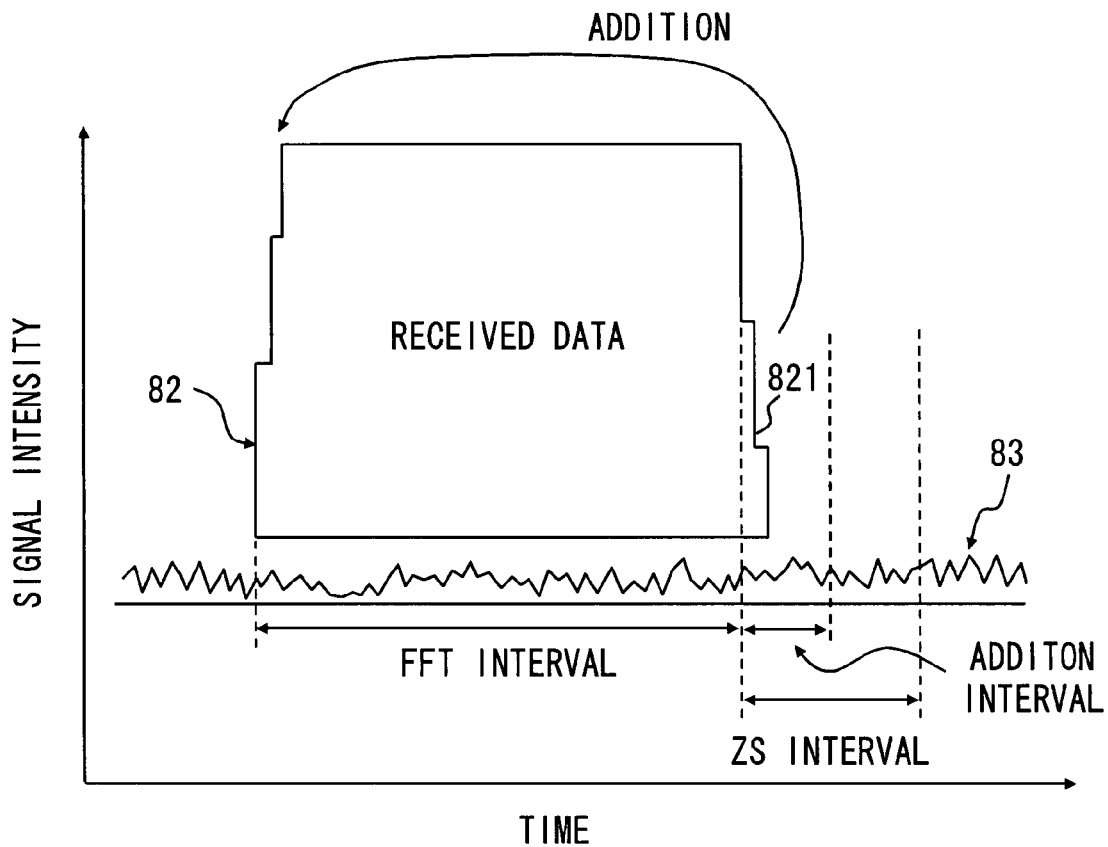
FIGS. 6A and 6B are views to describe the effects of the present invention.
Figure 6B:
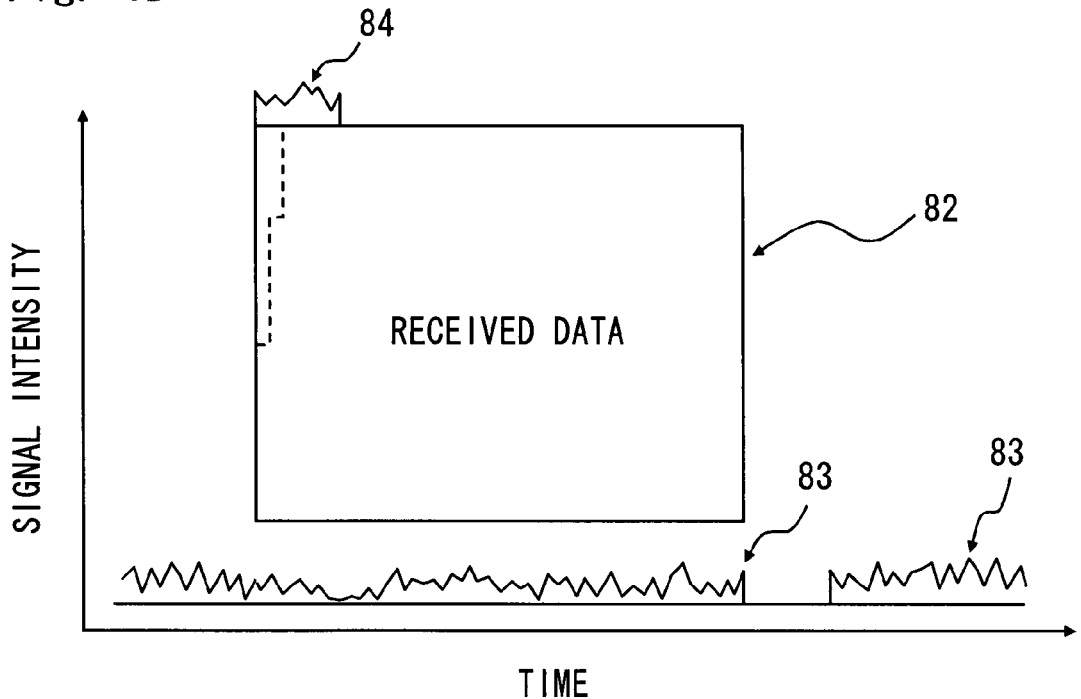
Figure 12A:
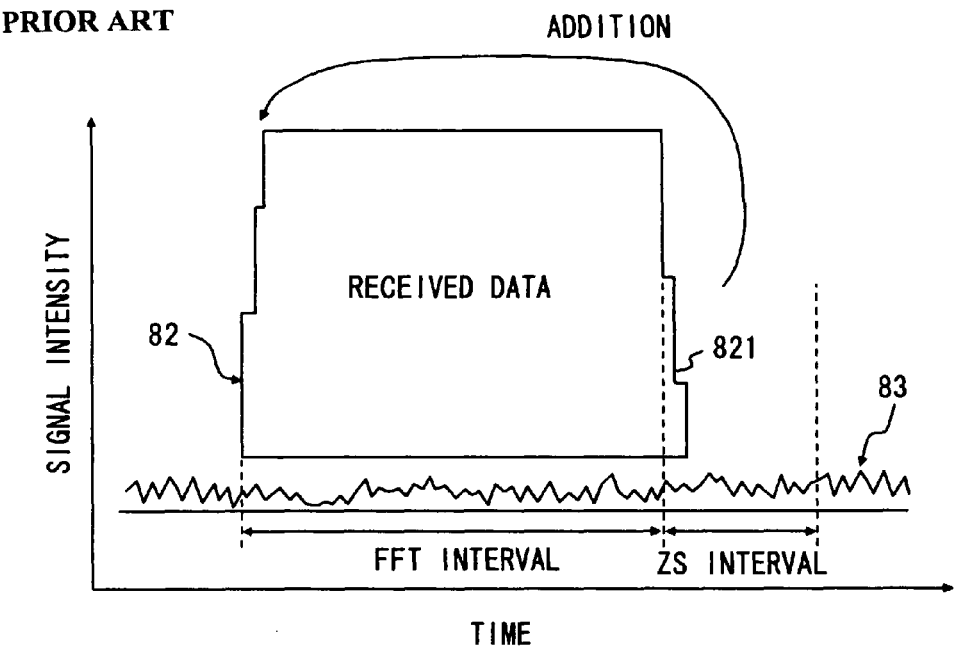
FIGS. 12A and 12B are views to describe the problems of a UWB receiver according to a related art.
Figure 12B:
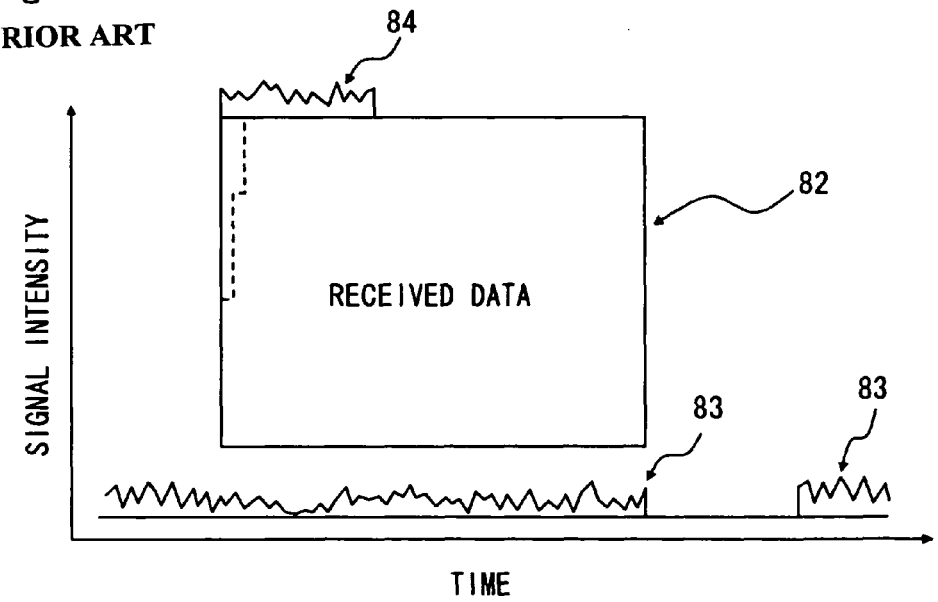

On the other hand, the UWB receiver 1 of this embodiment changes the overlap-addition number adaptively according to the amount of delay spread. If the delay spread is small as shown in FIG. 6A, it does not add the whole 32-sample zero suffix interval (ZS interval) but adds only a part of the interval, which is the addition interval shown in FIG. 6A, to the top of the received data 82 in the FFT interval. Therefore, as shown in FIG. 6B, the noise 82 which is added to the received data 82 is smaller than that in the configuration of always adding the whole 32 samples shown in FIG. 12. For example, if the overlap-addition number when the delay spread is small is 16, the penalty due to the overlap-addition is $10 \log_{10}(144/128)=0.51$ dB. The allowable CNR is thereby improved by 0.46 dB compared with the UWB receiver of a related art. Further, if the overlap-addition number is set to 0 when the multipath fading does not occur, the allowable CNR is improved by 0.97 dB compared with the UWB receiver of a related art.

Second Embodiment

In the UWB system that uses MB-OFDM for the PHY layer, the frequency hopping, which periodically switches a carrier wave frequency band to be used for transmission among three different frequency bands, is performed. In this case, the delay spread of a received signal can differ from frequency band to frequency band. Taking this into consideration, a UWB receiver 2 of a second embodiment of the present invention estimates the delay spread for each frequency band used and determines an overlap-addition number for each frequency band.

Figure 7:
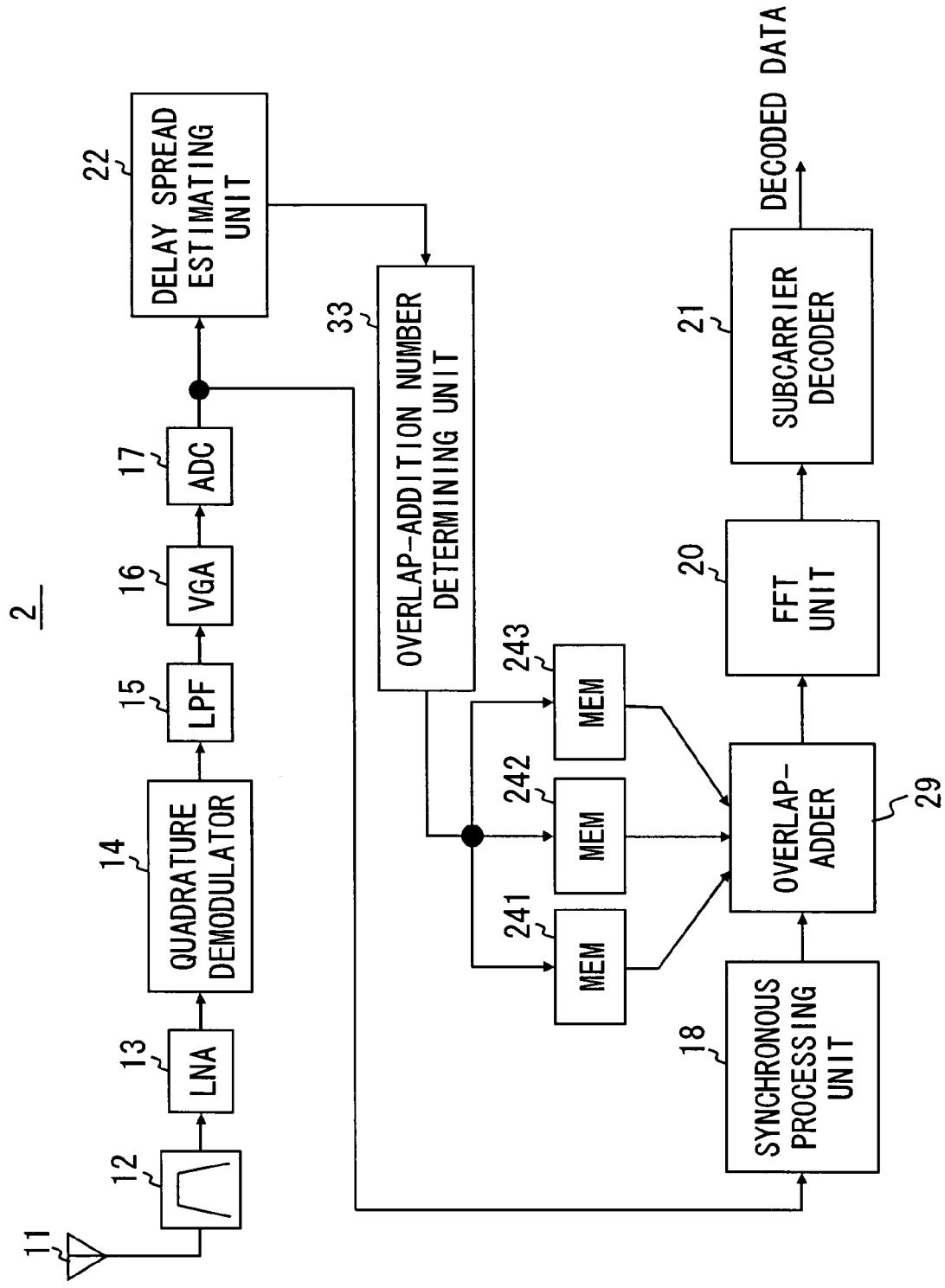
FIG. 7 is a block diagram showing a UWB receiver according to a second embodiment of the present invention.
Figure 8:
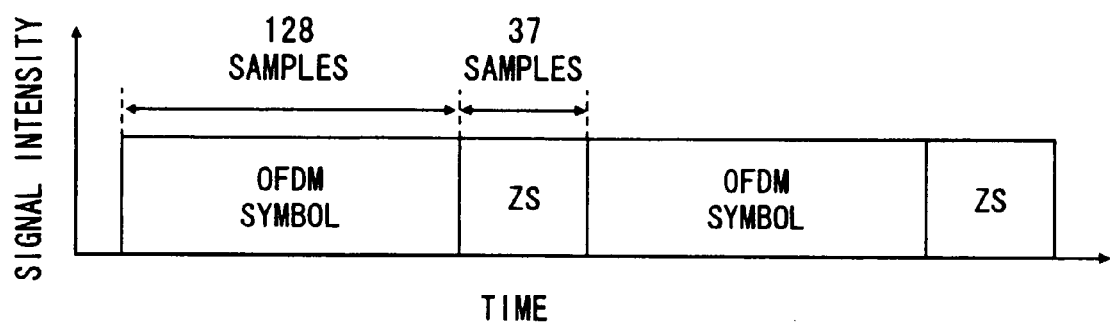
FIG. 8 is a view showing a transmission data format of UWB.

FIG. 7 shows the configuration of the UWB receiver 2 according to this embodiment. An overlap-addition number determining unit 33 calculates an overlap-addition number for each of the three frequency bands and stores the calculated overlap-addition number in one of three holding circuits 241 to 243. The holding circuits 241 to 243 are memories for storing overlap-addition numbers. The three holding circuits 241 to 243 respectively correspond one to one with the three frequency bands to be used. The overlap-adder 29 selects one holding circuit which holds the overlap-addition number corresponding to the frequency band of received data from the holding circuits 241 to 243 and performs the overlap-addition in accordance with the overlap-addition number which is stored in the selected holding circuit. The other elements in the UWB receiver 2 are the same as the elements in the UWB receiver 1 of the first embodiment and thus not described in detail herein.

In such a configuration, it is possible to select an appropriate overlap-addition number for each frequency band when the delay spread of a received signal differs from frequency band to frequency band.

Other Embodiments

The above-described embodiments 1 and 2 uses the delay spread as a parameter to indicate the degree of the spread of a delay time of a received signal due to the transmission through the multipath, which is a parameter to evaluate the delay characteristics of a received signal, and changes the overlap-addition number according to the amount of the delay spread. It is, however, possible to evaluate the delay characteristics of a received signal using a different evaluation parameter than the delay spread. For example, it is possible to calculate an arrival time interval between a direct wave and a reflected wave based on a time difference of a plurality of peak positions which appear in a correlation value between a received signal and a known preamble signal and use it as an evaluation parameter.

It is apparent that the present invention is not limited to the above embodiments, but may be modified and changed without departing from the scope and spirit of the invention.

What is claimed is:

1. A radio receiver to receive a signal transmitted through a radio transmission path, the signal containing a no-signal interval and an orthogonal frequency division multiplexed (OFDM) symbol, the OFDM symbol starting from a first time point and finishing at a second time point, the no-signal interval starting from the second time point and finishing at a third time point, the radio receiver comprising:
    a determining unit configured to determine an overlap-addition number based on delay characteristics of the signal received through the radio transmission path;
    an adder configured to sum data corresponding to the overlap-addition number out of data received in the no-signal interval with a top portion of the OFDM symbol within the first and second time points; and
    a calculating unit configured to calculate an evaluation parameter of the delay characteristics based on a correlation calculation result between the received signal and a known reference signal,
    wherein the determining unit determines an overlap-addition number based on the evaluation parameter and compares the evaluation parameter with a prescribed threshold and determines the overlap-addition number based on a comparison result.

2. The radio receiver according to claim 1, wherein the determining unit determines an overlap-addition number such that the overlap-addition number increases monotonely with an increase in delay spread of the received signal.

3. The radio receiver according to claim 1, wherein the evaluation parameter is delay spread.

4. The radio receiver according to claim 1, wherein the radio receiver receives a frequency hopped signal by switching among a plurality of frequency bands, and the determining unit determines an overlap-addition number for each of the frequency bands.

5. The radio receiver according to claim 1, wherein said no-signal interval includes a zero suffix interval.

6. A radio receiver to receive a signal transmitted through a radio transmission path, the signal containing a no-signal interval and an orthogonal frequency division multiplexed (OFDM) symbol, the OFDM symbol starting from a first time point and finishing at a second time point, the no-signal interval starting from the second time point and finishing at a third time point, the radio receiver comprising:
    a determining unit configured to determine an overlap-addition number based on delay characteristics of the signal received through the radio transmission path;
    an adder configured to sum data corresponding to the overlap-addition number out of data received in the no-signal interval with a top portion of the OFDM symbol within the first and second time points; and
    a calculating unit configured to calculate an evaluation parameter of the delay characteristics based on a correlation calculation result between the received signal and a known reference signal, wherein
    the determining unit determines an overlap-addition number based on the evaluation parameter,
    wherein the determining unit determines the overlap-addition number to be used in the adder by selecting an overlap-addition number associated with a multiplication result obtained by multiplying the evaluation parameter by a prescribed coefficient, and by limiting the multiplication result to be less than a predetermined limit value.

* * * * *